May 27, 1941.    J. A. GREGORY    2,243,801
ELECTRIC CONTROL VALVE MECHANISM
Filed Nov. 7, 1939    3 Sheets-Sheet 1
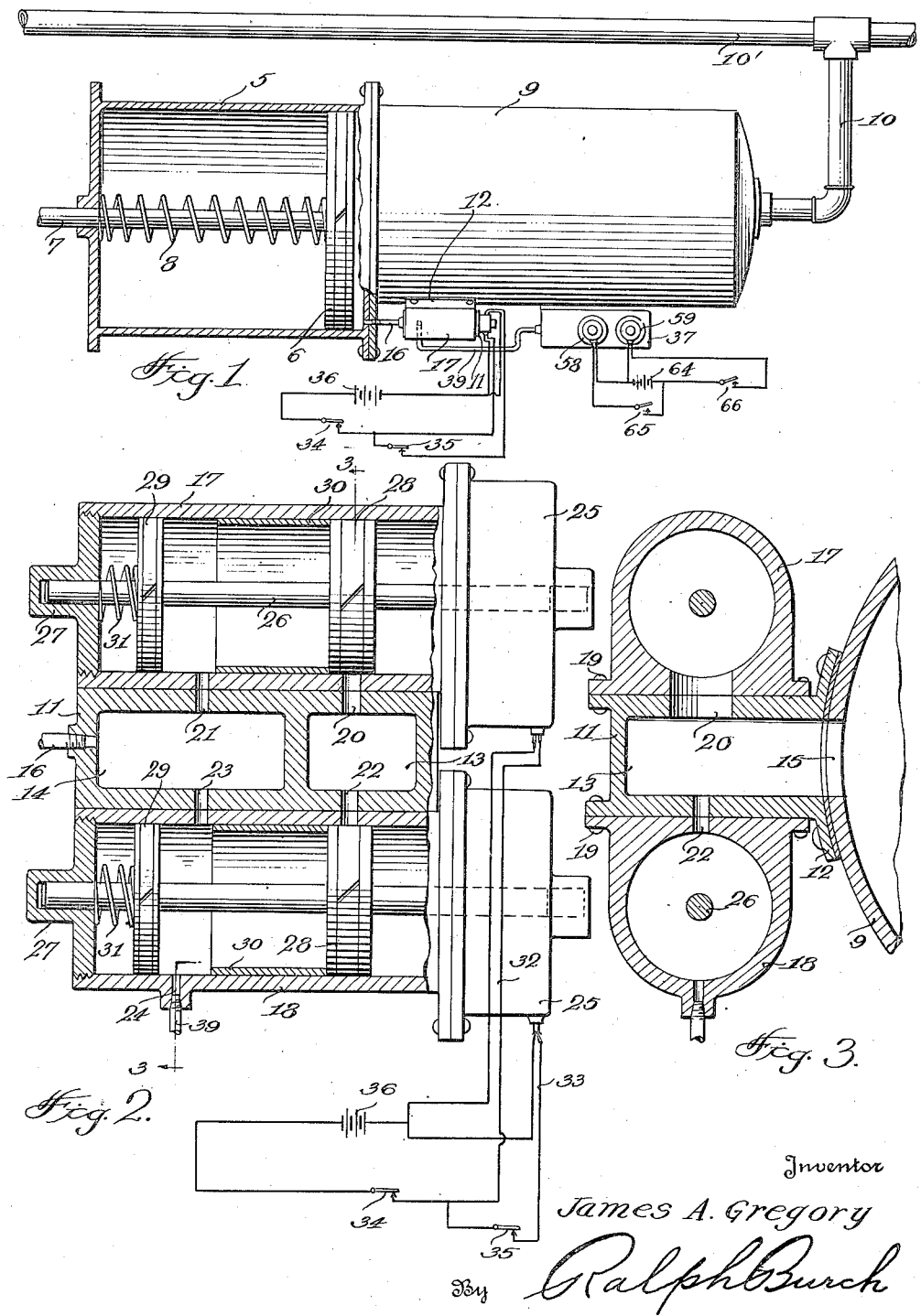
Inventor
James A. Gregory
By Ralph Burch
Attorney Inventor
James A. Gregory
By Ralph B. Burch
Attorney May 27, 1941.  J. A. GREGORY  2,243,801
ELECTRIC CONTROL VALVE MECHANISM
Filed Nov. 7, 1939　　3 Sheets-Sheet 3

Inventor
James A. Gregory
By Ralph Burch
Attorney

Patented May 27, 1941

2,243,801

UNITED STATES PATENT OFFICE 2,243,801

ELECTRIC CONTROL VALVE MECHANISM

James A. Gregory, Portland, Oreg.

Application November 7, 1939, Serial No. 303,278

6 Claims. (Cl. 303—20)

This invention relates to an electric control valve mechanism for air brake systems of railroad trains.

It is an object of the invention to provide a valve mechanism associated with the brake cylinder of each car of a train, operated by solenoids to control the flow of air to the brake cylinders whereby an equal pressure of air is supplied to the brake cylinders of each car simultaneously, thus eliminating jarring and jolting of the cars when the brakes are applied.

A further object of the invention resides in providing an electrically operated valve mechanism for controlling the exhaust of air from the brake cylinders when the brakes are released.

Another object of the invention resides in providing a mechanism of the above-mentioned character which is simple and durable in construction, reliable and efficient in operation and inexpensive to manufacture.

Other objects and advantages of the invention will be apparent during the course of the following description.

Figure 4:
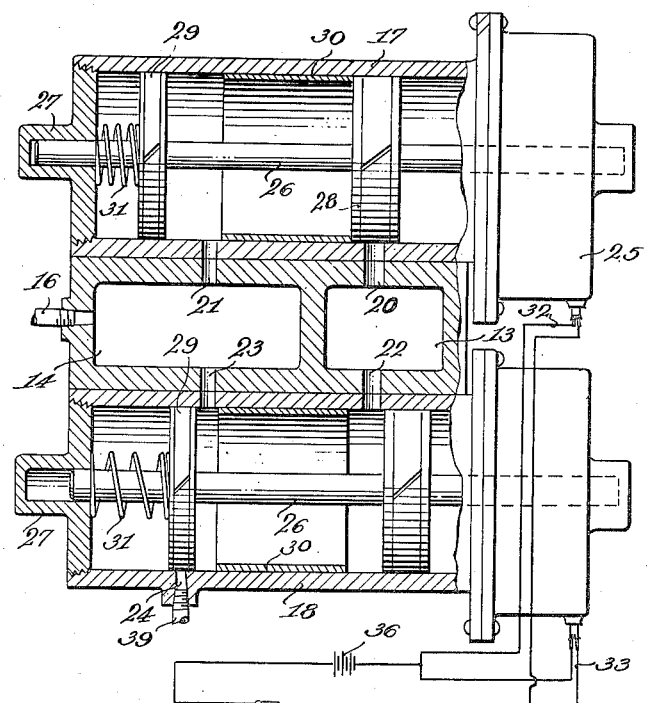
Figure 5:
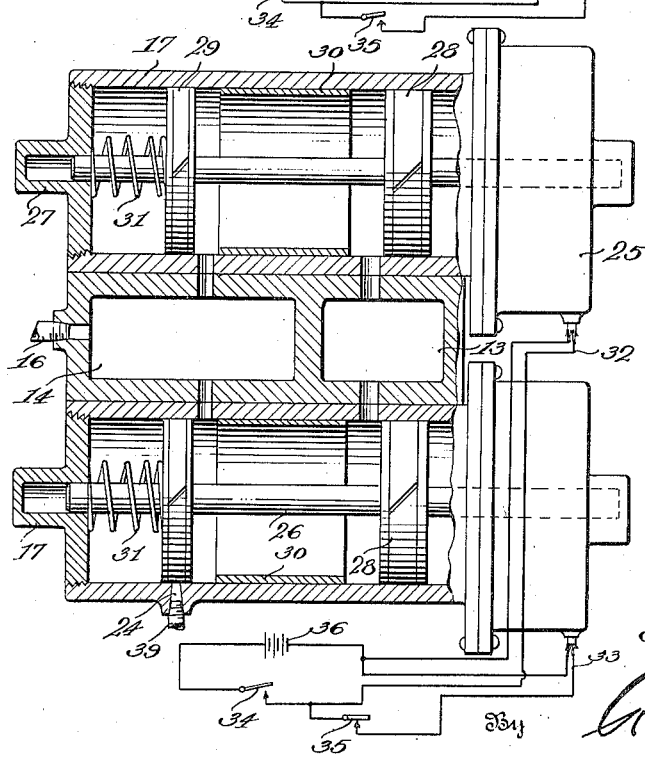
Figure 6:
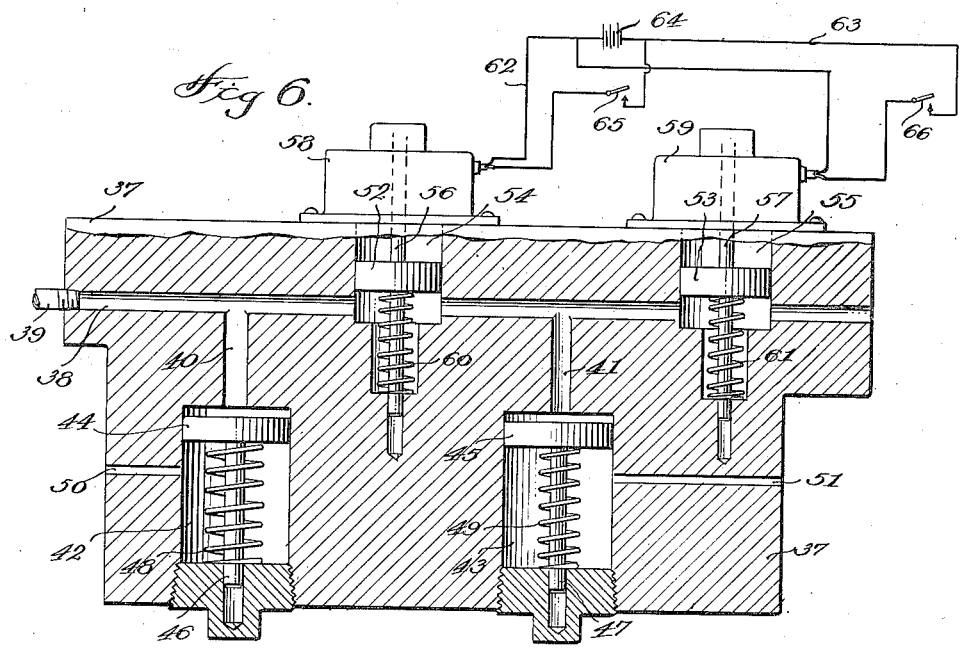
Figures 7, 8:
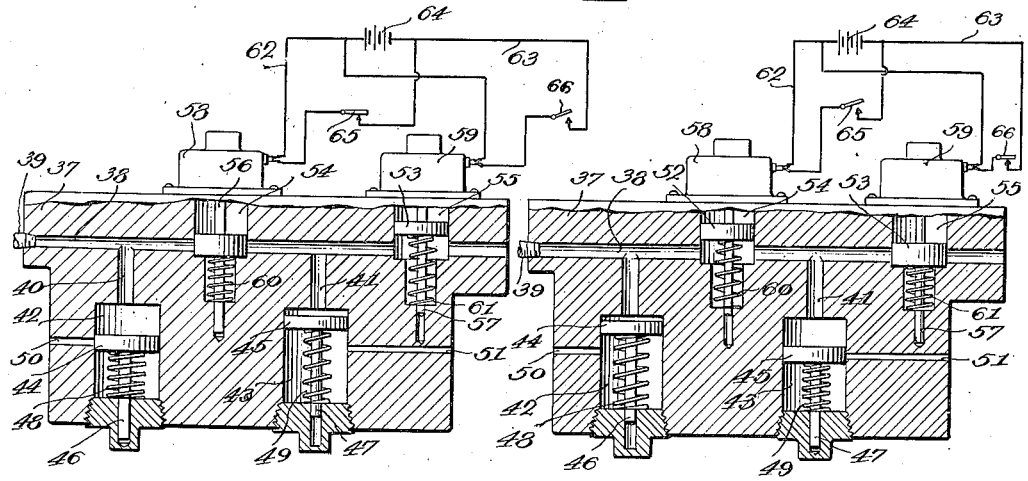

In the accompanying drawings, forming a part of this specification and in which like numerals are employed to designate like parts throughout the same, Fig. 1 is side elevation of the valve mechanisms applied to a brake cylinder, Fig. 2 is a sectional view of the valve mechanism for controlling the flow of air to the brake cylinder, Fig. 3 is a section taken on line 3—3 of Fig. 2, Fig. 4 is a sectional view of the valve mechanism with the service braking valve in open position, Fig. 5 is a similar view with the service and emergency braking valves both in open position, Fig. 6 is a sectional view of the valve mechanism for controlling the exhaust of air from the braking cylinder, Fig. 7 is a similar view showing the high pressure relief valve in operation, and, Fig. 8 is a similar view showing the low pressure relief valve in operation.

In the drawings, wherein for the purpose of illustration I have shown a preferred embodiment of my invention, the numeral 5 denotes the conventional brake cylinder of a railroad train air brake system having a piston 6 mounted to reciprocate therein, the piston being connected by a rod 7 with the braking mechanism of the car. A spring 8 mounted on the rod 7 between the piston and end of the cylinder normally moves the piston to release the brakes. An auxiliary reservoir 9 for the storage of compressed air is attached to the cylinder 5 and is connected through a pipe 10 with the main air line 10' which supplies the reservoir with compressed air.

Referring more particularly to my invention, I provide a valve mechanism for controlling the passage of air from the reservoir to the brake cylinder consisting of a block 11 attached to the side of the reservoir 9 by flanges 12 and having spaced chambers 13 and 14. The chamber 13 has communication with the reservoir 9 through a port 15 and the chamber 14 through a pipe 16 has communication with the brake cylinder 5. Mounted on opposite sides of the block 11 are valve cylinders 17 and 18 attached to the block by bolts 19. The cylinder 17 through ports 20 and 21 has communication with the chambers 13 and 14 and the cylinder 18 through ports 22 and 23 also communicates with the chambers 13 and 14, the cylinder 18 being also provided with an exhaust port 24 which connects with an exhaust control valve mechanism to be set forth hereinafter. A solenoid 25 is attached to the head of each of the cylinders 17 and 18 having a core 26 extending axially of the cylinders with its lower end slidably fitted in the boss 27. A pair of pistons 28 and 29 are mounted on the core 26 in spaced relation, the piston 28 being relatively thicker than the piston 29, so as to cover the ports 20 and 22 of the cylinders when the valve piston 28 is moved against its seat 30 by the energizing of the solenoid 25. A spring 31 mounted on the core 26 between the piston 29 and end of the cylinder is compressed when the solenoid is energized and upon de-energizing of the solenoid the spring 31 returns the pistons to their normal positions, in which position the piston 29 of the cylinder 18 covers the exhaust port 24. The solenoid 25 of each of the cylinders 17 and 18 are connected in electric circuits 32 and 33 having control switches 34 and 35 and a common source of current 36. The circuit 33 is connected in series with the circuit 2, so that upon opening of the switch 34 both of the circuits will be opened, whereas the switch 35 merely controls the opening of the circuit 33 to the solenoid of the cylinder 18.

In operation, the brakes are in released position when the solenoids of both the cylinders 17 and 18 are energized, for the pistons 28 then cover the ports 20 and 22 shutting off the flow of air from the chamber 13 to the cylinders. When a service application of the brakes is desired the switch 35 is opened breaking the circuit of the solenoid of the cylinder 18, thus de-energizing the solenoid so that the spring 31 moves the piston 28 to uncover the port 22 and moves the piston 29 to cover the exhaust port 24, as shown in Fig. 4. In this position air is permitted to flow from the chamber 13 into the cylinder 18 and through the port 23 to chamber 14 from where it passes into the brake cylinder 5, thus applying the brakes. To release the brake, the switch 35 is closed thereby energizing the solenoid to move the piston 28 into covering relation to the port 22 and the piston 29 to uncover the exhaust port 24. With the pistons in this position air from the brake cylinder 5 passes into the chamber 14 and from there into the cylinder 18 where it is discharged through the port 24. When an emergency application of the brakes is desired the switch 34 is opened which de-energizes the solenoids of both the cylinders 17 and 18 permitting the valve pistons 28 of both cylinders to be moved by springs 31 to an open position, as shown in Fig. 5, thus allowing air to pass from the chamber 13 into both cylinders and from the cylinders into the chamber 14 where it is discharged into the brake cylinder 5.

In order that the release of the brakes may be regulated I have provided a valve mechanism to control the exhaust of air from the cylinder 18 which consists of a block 37 attached to the reservoir 9 having a longitudinal passage 38 therethrough which at one end is connected by a pipe 39 with the exhaust port 24, the other end of the passage being open to the atmosphere. The passage 38 has branch passages 40 and 41 which communicate with valve chambers 42 and 43, respectively, and mounted to reciprocate in the chambers are piston valves 44 and 45 mounted on rods 46 and 47, each of the rods having an expansion spring 48 and 49, the spring 48 being heavier than the spring 49. The piston valves 44 and 45 are normally held seated in closed position by the springs, but upon admission of air to the chambers 42 and 43 the piston valves are moved to uncover the discharge passages 50 and 51 of the chambers which communicate with the atmosphere. The passage of air to the chambers 42 and 43 is controlled by piston valves 52 and 53 mounted to reciprocate in chambers 54 and 55 which intersect the passage 38. The piston valves 52 and 53 are mounted on rods 56 and 57 which form the core of the solenoid 58 and 59. Springs 60 and 61 mounted beneath the piston valves normally hold the piston valves in open position so that air can pass through the passage 38 to the atmosphere. The solenoids 58 and 59 are provided with independent circuits 62 and 63 connected to a source of current 64 and controlled by switches 65 and 66. Upon energizing of the solenoid 58 the piston valve 52 is moved to close the passage 38, thereby causing the exhaust air to pass into the chamber 42 where its discharge through the passage 50 is controlled by the piston valve 44. Due to the tension of spring 48 the valve 44 is only moved to open the port 50 until the pressure of air in the brake cylinder has been reduced to a predetermined pressure, after which the spring 48 closes the valve and retains the desired pressure in the brake cylinder. When the piston valve 52 is opened and the valve 53 closed air passes to the chamber 43 and is released by the valve 45 through the discharge passage 51. As the spring 49 is lighter than the spring 48, the air pressure in the brake cylinder is reduced to a greater degree than when the valve 44 is employed to reduce the air pressure.

If a sudden release of the brakes is desired both the valves 52 and 53 are opened permitting the air to flow through the passage 38 directly into the atmosphere. In Fig. 6 the valve mechanism is shown set for a sudden release of the brakes, Fig. 7 shows the mechanism set for a slow release of the brakes and Fig. 8 shows the mechanism set for a faster release of the brakes.

The improved mechanism provided for controlling the setting and release of the brakes of individual cars in a railroad train is substituted for the triple valve mechanism now commonly employed and is adapted for use in air brake systems wherein air is supplied to the main air line 10' by a compressor, and the amount of air pressure permitted to build up in the line 10' is controlled by a valve provided in the cab of the engine. Thus, it will be seen the braking force will be determined by the pressure of air in the reservoir 9 which will be the same as the pressure of air in the main line 10' and by controlling the pressure of air in the main line the braking force of the air in reservoir 9 will likewise be controlled. The electric circuits for the electric control mechanism are connected in parallel to the main electrical circuit extending throughout the length of the train of cars there being one electric control mechanism for the brake cylinder of each car and there is one control switch in the engine cab in series with the circuit indicated for the individual unit on each car in such a manner that the making or breaking of a switch in the cab will actuate the corresponding solenoid on each unit of each car throughout the entire length of the train. The electric control valve mechanism controls the passage of air to the brake cylinder and permits the braking force to be applied to each of the cars simultaneously thus eliminating jolting of the cars when the brakes are applied.

It is to be understood that the form of my invention herein shown and described is to be taken as a preferred example of the same and that certain changes in the shape, size and arrangement of the parts may be made without departing from the spirit of the invention or the scope of the subjoined claims.

Having thus described my invention, I claim:

1. In an electric valve mechanism for air brake systems, the combination with a brake cylinder and air reservoir, of a block secured to said reservoir having a chamber in communication with the reservoir, a second chamber in communication with the brake cylinder, valve cylinders on opposite sides of said block, ports in said first chamber communicating with said valve cylinders, ports in said second chamber communicating with said valve cylinders, piston valves mounted to reciprocate in said valve cylinders to open and close the ports of said first chamber, springs for moving said piston valves to open position, solenoids for closing said piston valves when energized, an exhaust port in one of said valve cylinders, and a second piston valve for opening and closing said exhaust port.

2. In an electric valve mechanism for air brake systems, the combination with a brake cylinder and air reservoir, of a block secured to said reservoir having a chamber in communication with the reservoir, a second chamber in communication with the brake cylinder, valve cylinders on opposite sides of said block, ports in said first chamber communicating with said valve cylinders, ports in said second chamber communicating with said valve cylinders, piston valves mounted to reciprocate in said valve cylinders to open and close the ports of said first chamber, springs to move said piston valves to open position, rods connected with said piston valves, and solenoids for reciprocating said rods to move said piston valves to a closed position.

3. In an electric valve mechanism for air brake systems, the combination with a brake cylinder and air reservoir, of a block attached to said reservoir having a chamber in communication with said reservoir, a second chamber in said block communicating with the brake cylinder, valve cylinders on opposite sides of said block, ports in said first chamber communicating with said valve cylinders, ports in said second chamber communicating with said valve cylinders, piston valves mounted to reciprocate in said valve cylinders to open and close the ports of said first chamber, an exhaust port in one of said cylinders, a release valve mechanism including a block having a main passage therethrough connected at one end to said exhaust port and having its opposite end open to the atmosphere, branch passages leading from said main passage, spring relief valves connected to said branch passages, piston valves interposed in said main passage for controlling the passage of air into said branch passages, and solenoids for operating the piston valves in said main passage.

4. In an electric control valve mechanism for air brake systems, the combination with a brake cylinder and air reservoir, of a valve casing interposed between said brake cylinder and reservoir having an exhaust port, a valve in said casing for controlling the passage of air from said reservoir to said brake cylinder and exhaust of air from said brake cylinder, a solenoid for operating said valve, a block having a main exhaust passage therethrough connected with the exhaust port of said valve casing, branch exhaust passages leading from said main exhaust passage, spring relief valves in said branch passages, each of said relief valves being operable by a predetermined pressure of air to exhaust the air from the branch passages, and electric operated means in said main exhaust passage adapted to selectively control the passage of air from said main passage into said branch passages.

5. In an electric control valve mechanism for air brake systems, the combination with a brake cylinder and air reservoir, of an electric operated valve interposed between said brake cylinder and reservoir adapted to control the admission of air to said cylinder and exhaust of air therefrom, an exhaust retarder mechanism including a block having a main passage therethrough adapted to be connected with the exhaust from said brake cylinder, branch exhaust passages leading from said main passage, spring relief valves in said branch passages, each of said relief valves being operable by a predetermined pressure of air to exhaust air from said branch passages, and electromagnetic operated means in said main passage adapted to selectively control the passage of the exhaust air from said main passage into said branch passages.

6. In an electric control valve mechanism for air brake systems, the combination with a brake cylinder and air reservoir, of an electromagnetic operated valve for controlling the admission of air to said brake cylinder and exhaust of air therefrom, an exhaust retarder mechanism including a block having a main passage therethrough adapted to be connected with the exhaust from said brake cylinder, branch passages leading from said main passage at spaced intervals, electromagnetic operated valves interposed in said main passage for controlling the passage of air through said main passage and said branch passages, and relief valves in said branch passages, each of said relief valves being operable at different predetermined pressures of air to release the exhaust air from said branch passages.

JAMES A. GREGORY.